Aug. 14, 1945.  S. M. GRISWOLD  2,381,951
MANUFACTURE OF INSOLES
Filed July 29, 1943

INVENTOR

UNITED STATES PATENT OFFICE 2,381,951

MANUFACTURE OF INSOLES

Stanley M. Griswold, Newton, Mass., assignor to B. B. Chemical Co., Boston, Mass., a corporation of Massachusetts Application July 29, 1943, Serial No. 496,547

22 Claims. (Cl. 36—22)

This invention relates to the manufacture of insoles for Goodyear welt shoes and particularly to composite ribbed strips, to methods of making and applying them to insole bodies to form reinforced insole ribs thereon, and to insoles so made.

In United States Letters Patent No. 2,288,448, granted June 30, 1942, on my application, and in my application Serial No. 496,546, filed July 29, 1943, I have disclosed several forms of composite ribbed strips in which the present invention may be embodied.

Objects of this invention are so to construct my prior composite ribbed strips that they will provide their own reinforcement so that a separate insole reinforcing operation will be unnecessary.

A further object is to provide a method of making insoles by the practice of which a satisfactory insole for welt work may be provided without performing a channeling operation or a separate reinforcing operation.

To this end, ribbed strips of various forms including any one of the composite ribbed strips disclosed in the patent and application above mentioned may be provided with a relatively wide reinforcing strip covering one face of the rib and at the base of the rib extending approximately at right angles to that face and substantially in the plane of the base of the ribbed strip. The composite strip to which the reinforcing strip is applied may consist of a base layer and a rib-forming layer, laid face to face and having their exposed surfaces coated with cement, preferably a pressure responsive cement such, for example, as latex cement, rubber cement or cement comprising synthetic rubber-like material. The two layers are attached together between their edges by suitable means such as stitches and the marginal portions of the rib-forming layer are folded up against each other and secured together by the cement coating thereon to form the rib and, in case it is desired to provide more substance at the base of the rib, a preferably narrower strip of material may be laid upon the stitches before the marginal portions are folded against each other or may be included in the stitching which holds the base layer and the rib-forming layer together. In place of the strip, a cord or core may be laid upon the stitches before the rib-forming layer is formed into the rib.

In accordance with the present invention, a reinforcing strip is added to a composite ribbed strip formed in any suitable manner, for example, such as above explained. One marginal portion of the reinforcing strip is secured, preferably by cement, to that side of the rib which will be the inner side when it is applied to an insole, the reinforcing strip being preferably, though not necessarily, located with one edge flush with the top of the rib and being worked closely into the angle between the rib and the base layer. The remainder of the width of the reinforcing strip extends beyond the inner edge of the base layer and is prepared for attachment to the body of an insole by being coated with a suitable cement, for example one of those above mentioned.

The composite ribbed strip having the reinforcing strip incorporated therein may be fabricated as an article of manufacture and supplied to shoe manufacturers for application to insoles, it being understood that the marginal portion of an insole blank or body rounded to proper size will be coated with cement similar to that provided on the attaching face of a composite reinforced strip.

The composite reinforced strip so prepared may be utilized by disposing the outer edge of the base layer in proper relation to the edge of the insole and pressing the base layer and the attaching face of the reinforced strip into firm engagement with the cemented margin of the insole.

The method of applying the strip preferably consists in simultaneously pressing locally inner and outer portions of the base layer adjacent to the rib against the insole, feeding the insole, for example, by a movement of the pressing surface, and then pressing the inwardly extending marginal portion of the reinforcing strip against the insole, these operations being repeated progressively to apply the composite reinforced strip to the margin of the insole.

In rounding the toe end of the insole, the pressing of the inwardly extending portion of the reinforcing strip may be discontinued, allowing this portion of the strip to form into folds except in the region adjacent to the rib. The puckers or folds in the inner portion of the reinforcing strip may be removed if desired, for example, by a cutting operation.

If desired, the inner flange of the composite ribbed strip may be very narrow, its width being only sufficient to form an angle between it and the rib into which the reinforcing strip is tucked close to the base of the rib.

By the present invention the various forms of ribbed strip disclosed in my patent and application referred to above are provided with a wide reinforcing strip secured, for example by cement, to the inner face of the rib and to the inner flange of the base layer.

Figure 1:
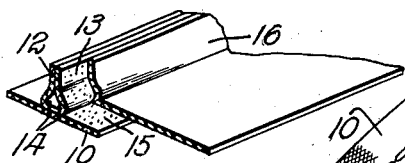
Fig. 1 is a fragmentary view in perspective of an end portion of one form of reinforced ribbed strip constructed in accordance with the present invention in which the ribbed strip comprises two layers attached to each other by parallel lines of stitches.

As shown in Fig. 1, a base layer 10 has secured to it a rib-forming strip 12 by means of two parallel lines of stitches 14 spaced from each other, for example, by a two-needle lock-stitch machine. The lower face of the strip 10 is cemented to enable it to be secured to a cemented marginal portion of an insole body and the upper face of the strip 12 is cemented so that when the marginal portions of this strip are folded up against each other, as shown in Fig. 1, they will adhere. The inner face 13 of the rib so formed and the upper face 15 of the adjacent flange of the strip 10 are cemented and a cemented reinforcing strip 16 is applied to the inner face of the rib, preferably with one edge flush with the top of the rib, and is forced closely into the angle between the rib and the flange of the layer 10, a portion of the reinforcing strip 16 extending beyond the flange of the base layer 10 a suitable distance, preferably at least as great as the width of the base layer.

Figure 2:
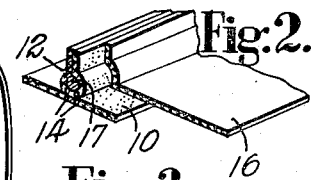
Fig. 2 is a similar view in which the ribbed strip is provided with a core.

Fig. 2 shows a construction similar to that of Fig. 1 except that before the rib-forming layer 12 is folded a cord or other form of core 17 is laid upon the stitches 14 and enclosed by folding up the marginal portions of the layer 12 about it, thus providing more substance at the base of the rib, as is sometimes desirable. The reinforcing strip 16 is applied in the same manner as in Fig. 1.

Figure 3:
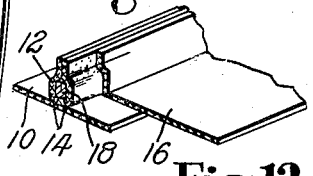
Fig. 3 is a view similar to Fig. 2 in which the rib layer encloses a folded strip in place of the core.

In Fig. 3 the strips 10 and 12 are united as in Figs. 1 and 2 and then a third strip 18 is laid upon and preferably cemented to the layer 12 over the stitches 14. The marginal portions of the strip 12 are then folded up, causing the strip 18 to be folded also, thus providing a rib comprising four thicknesses of material in addition to the reinforcing layer 16 which is then applied. The strip 18 is shown as narrower than the strip 12 so that the cemented surfaces of the marginal portions of the strip 12 come together above the folded strip 18, thus enclosing it. If desired, the strip 18 may be as wide as the strip 12, in which case the strip 18 would preferably be cemented on both sides.

Figure 4:
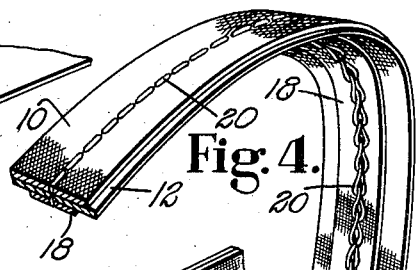
Fig. 4 is a perspective view showing the fastening together of three strips by means of a single line of chain stitches.
Figures 5, 6:
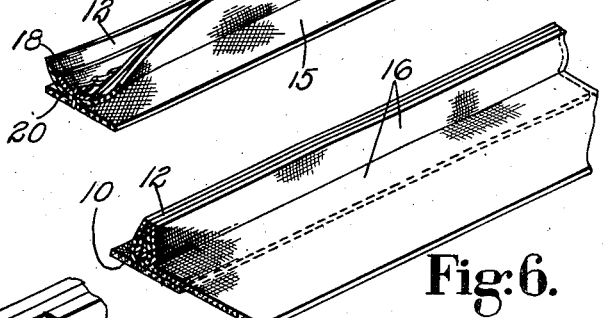
Fig. 5 is a perspective view showing how two of the strips of Fig. 4 are folded about the chain of the stitches to form a rib.
Fig. 6 is a perspective view of the ribbed strip of Fig. 5 with the reinforcing strip added.
Figure 7:
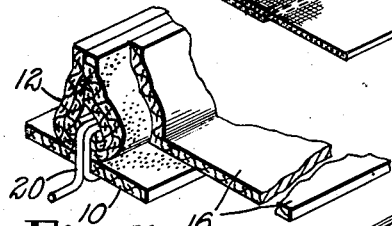
Fig. 7 is an enlarged perspective view of the construction shown in Fig. 6 with a portion of the reinforcing strip removed to render the construction clearer.

In Fig. 4 strips such as the strips 10, 12 and 18 of Fig. 3 are shown as united by a single line of chain stitches 20, the chain of the stitch lying on the strip 18. The chain, therefore, provides a wide base about which the layers 12 and 18 are folded to form a rib, as shown in Fig. 5, the reinforcing strip 16 being then applied as shown in Fig. 6. This construction is shown on an enlarged scale in Fig. 7.

Instead of uniting all three strips 10, 12 and 18 by the chain stitch 20, only the strips 10 and 12 may be so united, the third strip 18 being laid over the chain of the stitches and preferably cemented thereto. This construction is shown in Fig. 8, the reinforcing strip 16 being applied as above described.

Figures 8, 9, 13, 14:
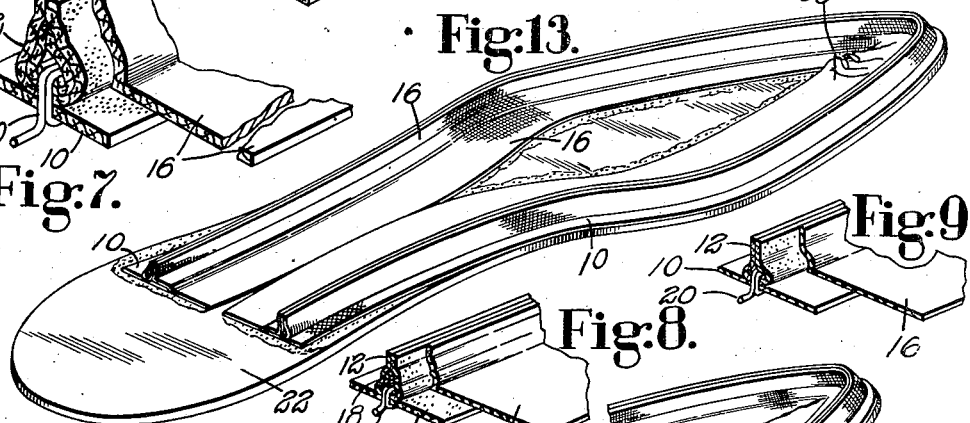
Fig. 8 is a view similar to Fig. 7 in which the enclosed strip is not secured by the chain stitches.
Fig. 9 is a view similar to Fig. 8 in which the enclosed strip is omitted.
Fig. 13 is a perspective view of an insole to which the reinforced ribbed strip has been applied, showing wrinkling of the reinforcing strip at the toe.
Fig. 14 is a fragmentary perspective of the toe portion of Fig. 12 showing the wrinkles removed.

If desired, the strip 18 of the construction shown in Fig. 8 may be omitted, the composite reinforced ribbed strip then having the construction shown in Fig. 9.

Figure 10:
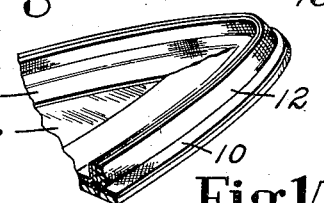
Fig. 10 is a view similar to Fig. 9 in which a core in the form of a cord is laid on the chain stitches before folding the rib-forming strip.

Instead of the strip 18, as shown in Fig. 8, the cord or core 17 may be laid on the chain of the stitches and enclosed by the strip 12 and the rib and flange reinforced as before, the resulting construction being as shown in Fig. 10.

Figure 11:
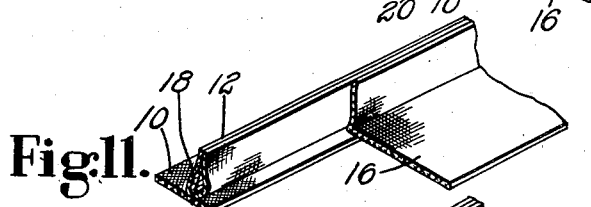
Fig. 11 is a perspective view of a modified ribbed strip in which the flange of the base layer on the inner or reinforced side is very narrow.

Any of the ribbed strips above described may have a narrow flange on the reinforced side of the rib; that is, the base layer may be narrower and the stitching 14 or 20 may be located near one edge of the layer 10. This construction is indicated in Fig. 11 where, except as to the narrow inner flange, the construction is similar to that shown in Figs. 6 and 7. This construction provides a greater area for the direct attachment of the strip 16 to the insole.

To facilitate bending of the strip 10 in rounding curved portions of the insole, it is usually bias cut. The other strips 12, 16 and 18 may be square cut and the strip 12 or 18, or both, may be stiffened if desired by any suitable means such, for example, as those disclosed in my patent above mentioned to give greater firmness to the rib. The reinforcing strip 16 is tucked well into the angle between the rib and the inner flange of the base layer 10 and, since the angle of the strip 16 is disposed at a substantial distance from the seams 14 or from the chain-stitch seam 20, the upstanding portion of the strip 16 acts as a brace for the rib against outward movement thereof.

An insole 22 of suitable material such as leather or latex-impregnated fiber, is rounded to proper shape and its marginal portion for a distance as wide as the attaching face of the composite reinforced ribbed strip is coated with cement, preferably pressure-responsive cement such, for example, as rubber cement, latex cement or cement comprising synthetic rubber-like material. The composite strip is laid upon the insole, as illustrated in Fig. 13, the outer edge of the base layer 10 being located substantially flush with the edge of the insole around the forepart and preferably spaced inwardly slightly from the edge of the insole in the shank portions, the cemented face of the strip 10 and the cemented portion of the reinforced strip 16 which extends beyond it being pressed firmly against the cemented margin of the insole to cause adhesion thereto. The major portion of the strip 16 which is attached to the surface of the insole body 22 serves effectively in place of an all-over reinforcement to prevent any outward movement of the rib due to strains which occur during lasting and sewing or during subsequent wear of the shoe.

Figure 12:
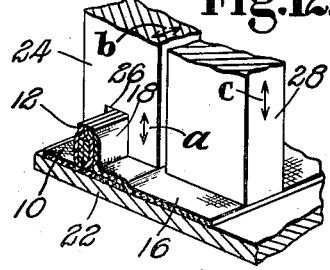
Fig. 12 is a perspective view, partly broken away, illustrating a method of applying the reinforced ribbed strip to an insole.

To effect the attachment of the composite reinforced rib-forming strip to the insole, it is preferable to apply local pressure intermittently at both sides of the rib simultaneously, for example, by a member such as that shown at 24 in Fig. 12. This member is notched at 26 to straddle the rib and is moved up and down heightwise of the rib, as indicated by the arrow $a$, to press the outer flange of the strip 10 against the feather portion of the insole and to press the reinforcing strip 16 at the other side of the rib against the inner flange of the strip 10 as well as to press that flange against the insole 22 to secure firm adhesion of the flanges to the insole and of the reinforcing strip 16 to the inner flange. Movement of the member 24 lengthwise of the rib while pressed against the insole, as indicated by the arrow $b$, is utilized to effect feeding of the insole step by step with its attached strip. The remainder of the inwardly projecting portion of the reinforcing strip 16 is preferably treated by a separate pressure-applying member 28 which is independently operated to move up and down only, as indicated by the arrow $c$, in timed relation to the movements of the member 24 to press the inner portions of the strip 20 and any wrinkles or folds that may be formed therein against the body of the insole. The member 28 preferably acts while the member 26 is raised and is being retracted for a new feeding movement. Since the members 26 and 28 are operated independently in case the member 28 is held up slightly by encountering a fold in the strip 20, the action of the member 24 is not affected and insures firm attachment of the limited area which it engages to the insole without wrinkles.

Preferably, when rounding the toe where wrinkles or folds occur most frequently in the inner portion of the reinforcing strip 16, the action of the member 28 is discontinued, especially on narrow or pointed toes, so that rounding of the toe is not interfered with by the member 28 and the formation of wrinkles in the reinforcing strip 16 is permitted, as indicated at 30 in Fig. 13. The wrinkles so formed may be pressed down and allowed to remain or their upstanding portions may be cut off, as shown in Fig. 14.

Having thus described my invention, what I claim as new and desire to secure by Letters Patent of the United States is:

1. A composite strip for application to insoles to form sewing ribs thereon comprising an upstanding sewing rib having attaching flanges at its base and a reinforcing strip attached to one side of the rib, extending into the angle between the rib and one of the flanges and projecting a substantial distance beyond the flange, the attaching faces of the flanges and reinforcing strip being coated with cement.

2. A composite strip for application to insoles to form sewing ribs thereon comprising a flat strip, another strip secured thereto with its margins upturned to form a rib, the flat strip forming attaching flanges for the rib, and a reinforcing strip attached to one side of the rib extending into the angle between the rib and one of the flanges and projecting a substantial distance beyond said flange, the attaching faces of the flanges and reinforcing strip being coated with cement.

3. A composite strip for application to insoles to form reinforced sewing ribs thereon comprising a flat strip, another strip folded upon itself and having its fold secured to the first strip to form a rib thereon, and a reinforcing strip attached to one side of the rib and to the adjacent portion of the flat strip, said reinforcing strip extending a substantial distance beyond the flat strip.

4. A composite strip for application to insoles to form sewing ribs thereon comprising a plurality of strips sewed together between their edges, one strip being flat to form attaching flanges and the other strip being bent to enclose the stitches and to form an upstanding sewing rib, and a reinforcing strip attached to one side of the rib, extending into the angle between the rib and one of the flanges and projecting a substantial distance beyond the adjacent flange, the attaching faces of the flanges and reinforcing strip being coated with pressure-responsive cement.

5. A composite strip for attachment to an insole to form a sewing rib thereon comprising a base strip, a plurality of strips attached to the base strip between their edges by a continuous seam, the plurality of strips exclusive of the base strip having their free marginal portions turned up against each other to form a sewing rib, the base strip remaining undisturbed, and a reinforcing strip secured to one side of the sewing rib and to one of the flanges formed by the base strip and extending beyond the base strip to constitute a reinforcement for the insole rib.

6. An insole for use in the manufacture of welted shoes comprising an insole-shaped body, a base strip attached by cement alone to the marginal portion of the body, a plurality of strips attached to the base strip between their edges by a continuous seam, the plurality of strips exclusive of the base strip having their free marginal portions disposed against each other to form a sewing rib, and a reinforcing strip secured to the inner side of the sewing rib, to the adjacent flange of the base strip and to the adjacent portion of the insole body.

7. A composite strip for attachment to insoles to form sewing ribs thereon comprising a base strip cemented on one of its faces, a plurality of rib-forming strips secured to the uncemented side of the base strip by a line of chain stitches, the chain of the stitches being on one of the plurality of rib-forming strips, the free margins of the rib-forming strips being secured together to enclose the chain stitches and one of the rib-forming strips, and a reinforcing strip secured to one side of the rib and to the adjacent portion of the base strip.

8. An insole for use in the manufacture of welted shoes comprising an insole-shaped body, a base strip attached by cement alone to the marginal portion of the body, a plurality of strips attached to the base strip between their edges by a continuous chain stitch seam, the chain of the stitches being on the side remote from the base strip, the plurality of strips exclusive of the base strip having their free marginal portions disposed against each other to form a sewing rib, and a reinforcing strip secured to the inner side of the sewing rib, to the adjacent flange of the base strip and to the adjacent portion of the insole body.

9. That improvement in methods of forming composite strips for attachment to insoles which comprises attaching together between their edges by a line of stitches a plurality of strips of material, folding the free margins of all but one of the strips to enclose the stitches and to form a sewing rib, the margins of the unfolded strip forming attaching flanges, and securing to one side of the rib and to the adjacent face of one of the flanges a reinforcing strip, said reinforcing strip extending beyond the flange to which it is attached to provide a wide reinforcement.

10. That improvement in methods of forming composite strips for attachment to insoles which comprises attaching together between their edges by a line of chain stitches three strips of material, folding the free margin of two of the strips to enclose the chain of the stitches and to form a sewing rib, the margins of the third strip forming attaching flanges, and securing to one side of the rib and to the adjacent face of one of the flanges a fourth strip, said fourth strip extending beyond the flange to which it is attached to provide a wide reinforcement.

11. That improvement in methods of forming composite strips for attachment to insoles to form sewing ribs thereon which comprises providing a strip cemented on one side to form a base strip, disposing second and third strips on the uncemented side of the base strip, securing the three strips together between their edges by stitches, turning up the margins of the second and third strips to form a sewing rib, and attaching a wide reinforcing strip to one side of the rib so formed and to the adjacent marginal portion of the base strip.

12. That improvement in methods of forming composite strips for attachment to insoles to form sewing ribs thereon which comprises providing a strip cemented on one side to form a base strip, disposing second and third strips on the uncemented side of the base strip, securing the three strips together by chain stitches, the chain of the stitches being upon the third strip, turning up the margins of the second and third strips to enclose the chain and form a sewing rib, and attaching a wide reinforcing strip to one side of the rib so formed and to the adjacent marginal portion of the base strip.

13. That improvement in methods of making insoles which comprises providing an insole-shaped body having cement on its marginal portion, providing a strip cemented on one side to form a base strip, disposing second and third strips on the uncemented side of the base strip, securing the three strips together by chain stitches, turning up the margins of the second and third strips to enclose the chain of the stitches and form a sewing rib, attaching a wide reinforcing strip to one side of the rib so formed and to the adjacent marginal portion of the base strip, said reinforcing strip extending beyond the base strip, and then securing the base strip and the extension of the reinforcing strip to the marginal portion of the insole body.

14. That improvement in methods of making insoles which comprises providing an insole-shaped body with cement on its marginal portion, providing a ribbed strip having a narrow flange on one side of the rib and a wide flange on the other side of the rib, said wide flange being sufficient in extent to reinforce the rib without additional reinforcement, locating the strip with respect to the edge of the insole, pressing the strip upon the insole at opposite sides of the rib including the portion of the wide flange adjacent to the rib, releasing said pressure, and pressing the remainder of the wide flange against the body of the insole.

15. That improvement in methods of making insoles which comprises providing an insole-shaped body with cement on its marginal portion, providing a ribbed strip having a narrow flange on one side of the rib and a wide flange on the other side of the rib, said wide flange being sufficient in extent to reinforce the rib without additional reinforcement, locating the strip with respect to the edge of the insole, pressing the strip upon the insole at opposite sides of the rib including the portion of the wide flange adjacent to the rib, and then pressing the remainder of the wide flange against the body of the insole.

16. That improvement in methods of making insoles which comprises providing an insole-shaped body having cement on its marginal portion, providing a strip cemented on one side to form a base strip, securing a second strip on the uncemented side of the base strip, turning up the margins of the second strip to form a sewing rib, attaching a wide reinforcing strip to one side of the rib so formed and to the adjacent portion of the base strip, said reinforcing strip extending beyond the base strip, and then securing the base strip and the extension of the reinforcing strip to the marginal portion of the insole body.

17. That improvement in methods of making insoles which comprises providing an insole-shaped body with cement on its marginal portion, providing a ribbed strip having a narrow flange at one side of the rib and a wide flange at the other side of the rib, said wide flange being sufficient in extent to provide a reinforcement for the insole, locating the strip with respect to the edge of the insole, pressing the strip upon the insole at opposite sides of the rib, relieving the pressure, and then pressing the remainder of the wide flange against the insole.

18. That improvement in methods of making insoles which comprises providing an insole body having cement on its marginal portion, providing a strip cemented on one side to form a base strip, disposing a second and third strip on the uncemented side of the base strip, securing the strips together by a line of stitches located between their edges, turning up the margins of the second strip to enclose the third strip and form a sewing rib, attaching a wide reinforcing strip to one side of the rib so formed and to the adjacent marginal portion of the base strip, said reinforcing strip extending beyond the base strip, and then securing the base strip and the extension of the reinforcing strip to the marginal portion of the insole body.

19. That improvement in methods of making insoles which comprises providing an insole-shaped body with cement on its marginal portion, providing a ribbed strip having a narrow flange on one side of the rib and a wide flange on the other side of the rib, said wide flange being sufficient in extent to reinforce the rib without additional reinforcement, locating the strip with respect to the edge of the insole, pressing the strip upon the insole at longitudinally localized areas on opposite sides of the rib including the portion of the wide flange adjacent to the rib, feeding the insole one step, releasing said pressure, pressing a longitudinally localized portion of the remainder of the wide flange against the body of the insole, and repeating said operations step by step progressively to attach the strip to the insole.

20. That improvement in methods of making insoles which comprises providing an insole-shaped body having cement on its marginal portion, providing a ribbed strip having a narrow flange on one side of the rib and a wide flange on the other side of the rib, locating the narrow flange with respect to the edge of the insole, simultaneously pressing longitudinally localized portions of the narrow flange and the wide flange adjacent to the rib against the insole, then pressing a longitudinally localized portion of the remainder of the wide flange against the insole, and repeating these operations step by step about the periphery of the insole progressively thereby providing the insole with a reinforced sewing rib.

21. That improvement in methods of making insoles which comprises providing an insole-shaped body with cement on its marginal portion, providing a ribbed strip having a narrow flange on one side of the rib and a wide flange on the other side of the rib, said wide flange being sufficient in extent to reinforce the rib without additional reinforcement, locating the narrow flange with respect to the edge of the insole, simultaneously pressing longitudinally localized portions of the narrow flange and of the wide flange adjacent to the rib upon the insole, pressing the longitudinally localized portion of the remainder of the wide flange against the body of the insole, repeating said pressing operations progressively step by step along the sides of the insole, and while rounding the toe discontinuing the pressing of the inner portion of the wide flange and allowing folds to form therein.

22. That improvement in methods of making insoles which comprises providing an insole-shaped body with cement on its marginal portion, providing a ribbed strip having a narrow flange on one side of the rib and a wide flange on the other side of the rib, said wide flange being sufficient in extent to reinforce the rib without additional reinforcement, locating the narrow flange with respect to the edge of the insole, simultaneously pressing longitudinally localized portions of the narrow flange and of the wide flange adjacent to the rib upon the insole, pressing the longitudinally localized portion of the remainder of the wide flange against the body of the insole, repeating said pressing operations progressively step by step along the sides of the insole, while rounding the toe discontinuing the pressing of the inner portion of the wide flange and allowing folds to form therein, and thereafter removing the folds.

STANLEY M. GRISWOLD.